(12) United States Patent
Wendlandt et al.

(10) Patent No.: US 6,777,691 B2
(45) Date of Patent: Aug. 17, 2004

(54) STORAGE PHOSPHOR CASSETTE

(75) Inventors: William C. Wendlandt, Rush, NY (US); Daniel N. Peek, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 99 days.

(21) Appl. No.: 09/923,186

(22) Filed: Aug. 6, 2001

(65) Prior Publication Data

US 2003/0010932 A1 Jan. 16, 2003

Related U.S. Application Data

(63) Continuation-in-part of application No. 09/896,697, filed on Jun. 29, 2001.

(51) Int. Cl.[7] ............................................... G03B 42/02
(52) U.S. Cl. ................................. 250/484.4; 250/485.1
(58) Field of Search ........................... 250/484.4, 485.1, 250/581

(56) References Cited

U.S. PATENT DOCUMENTS

| | | | |
|---|---|---|---|
| 4,336,678 A | 6/1982 | Peters | |
| 5,034,256 A | 7/1991 | Santiso, III et al. | |
| 5,276,333 A | * 1/1994 | Robertson | 250/484.4 |
| 5,861,631 A | 1/1999 | Wendlandt et al. | 250/484.4 |
| 5,869,839 A | 2/1999 | Wendlandt et al. | 250/484.4 |
| 5,943,390 A | 8/1999 | Wendlandt et al. | 378/189 |

FOREIGN PATENT DOCUMENTS

EP          0 585 041 A1      2/1994

* cited by examiner

*Primary Examiner*—Otilia Gabor
(74) *Attorney, Agent, or Firm*—Susan L. Parulski

(57) ABSTRACT

An x-ray cassette having increased durability. The x-ray cassette comprises a shell and a storage phosphor assembly. The shell comprises an upper and lower panel, a first and second side member, and a front end member. The first and second side members and front end member join the upper and lower panels to define a cavity having an open end. The storage phosphor assembly comprises a back end member, an insert plate, and an edge insert. The storage phosphor assembly is adapted to be removably contained within the shell such that the back end member closes off the open end of the shell. A first side of the edge insert is affixed to the insert plate. A first end of the edge insert is disposed adjacent the back end member, and a second end of the edge insert comprises at least one recess on the first side. In a preferred embodiment, the insert plate includes a honeycomb core comprising honeycomb cells wherein the honeycomb cells disposed along a perimeter of the honeycomb core are filled with an adhesive or epoxy.

22 Claims, 11 Drawing Sheets

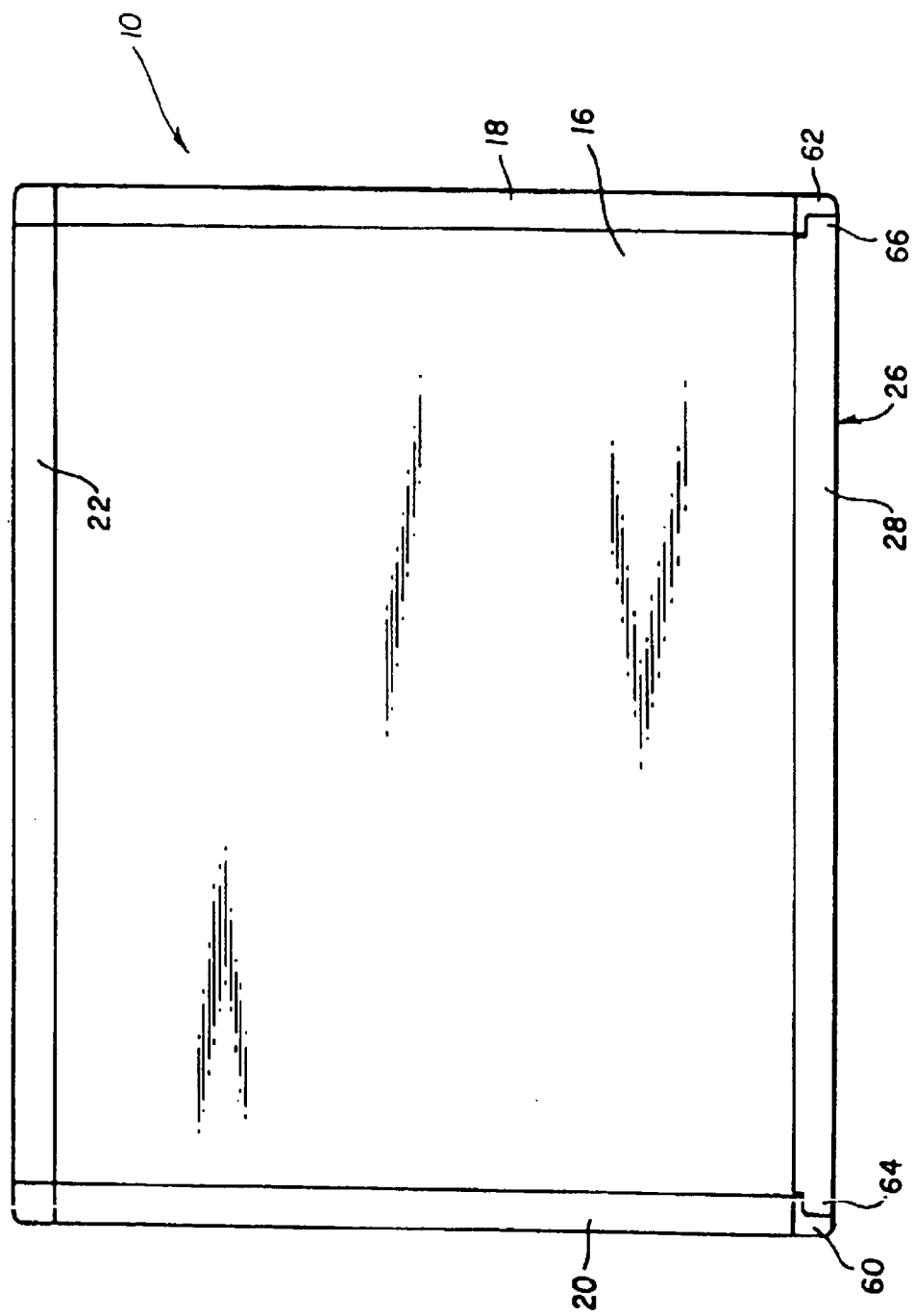

といいStorage Phosphor Cassette

STORAGE PHOSPHOR CASSETTE

CROSS REFERENCE TO RELATED APPLICATION

This is a continuation-in-part of application Ser. No. 09/896,697, filed Jun. 29, 2001 entitled "STORAGE PHOSPHOR CASSETTE" by Wendlandt et al.

Reference is made to commonly assigned application U.S. Ser. No. 09/896,735, entitled "A STORAGE PHOSPHOR CASSETTE HAVING A CORNER ELEMENT", and filed on Jun. 29, 2001 in the names of Wendlandt et al., and which is assigned to the assignee of this application.

Reference is made to commonly assigned application U.S. Ser. No. 09/896,625, entitled "STORAGE PHOSPHOR CASSETTE", and filed on Jun. 29, 2001 in the names of Wendlandt et at., and which is assigned to the assignee of this application.

FIELD OF THE INVENTION

The present invention relates generally to cassettes for photographic elements, and more particularly, to an x-ray cassette used in computed radiography.

BACKGROUND OF THE INVENTION

In the field of computed radiography, a photographic element has an image formed thereon by x-rays. The photographic element is subsequently provided to a reader wherein the element is stimulated to emit a radiation pattern that is indicative of the image formed by the x-rays. Typically, storage phosphors are used to capture radiographic images from incident x-rays. Most radiographic procedures are carried out within normal room lighting conditions, accordingly, a primary requirement for any computed radiography x-ray cassette is to shield the storage phosphor from exposure by ambient light.

Cassettes of the kind used in computed radiography may comprise a container having an upper and lower parts that are hinged together so that they can be opened for insertion of a flexible film sheet or a rigid film plate comprising the photographic element. The cassette is closed and latched so that the cassette with the element therein can be used with an x-ray apparatus to produce an image on the photographic element. Then, the cassette is taken to a reader where the cassette is opened and the photographic element extracted by suitable feeders, such as a suction feeding device. The photographic element separates from the cassette, and is transported through the reader where it is stimulated to emit a radiation pattern which is captured for storage and use. The radiation pattern is subsequently erased from the photographic element before being returned to the cassette for re-use.

U.S. Pat. Nos. 5,861,631 (Wendlandt et al.), 5,869,839 (Wendlandt et al.), and 5,943,390 (Wendlandt et al.), commonly assigned and incorporated herein by reference, disclose cassettes of the kind used in computed radiography.

While such cassettes may have achieved certain degrees of success in their particular applications, cassettes are susceptible to various types of damage when dropped or roughly handled. Accordingly, it is desirable to increase the durability of the cassette while minimizing cost and weight, and preserving the same basic nature of design.

Accordingly, a need continues to exist for a cassette which is durable and reduces its susceptibility to damage when dropped or roughly handled, and the same basic nature of design is preserved.

SUMMARY OF THE INVENTION

An object of the present invention is to provide a cassette which has increased durability, and is resistant to damage when dropped or roughly handled.

This object is given only by way of illustrative example. Thus, other desirable objectives and advantages inherently achieved by the disclosed invention may occur or become apparent to those skilled in the art. The invention is defined by the appended claims.

According to one aspect of the invention, there is provided a x-ray cassette comprising a shell and a storage phosphor assembly. The shell comprises an upper and lower panel, a first and second side member, and a front end member. The first and second side members and front end member join the upper and lower panels to define a cavity having an open end. The storage phosphor assembly comprises a back end member, an insert plate, and an edge insert. The storage phosphor assembly is adapted to be removably contained within the shell such that the back end member closes off the open end of the shell. A first side of the edge insert is affixed to the insert plate. A first end of the edge insert is disposed adjacent the back end member, and a second end of the edge insert comprises at least one recess on the first side. In a preferred embodiment, the second end of the edge insert comprises a plurality of spaced recesses. In a preferred embodiment, the insert plate includes a honeycomb core comprising honeycomb cells wherein the honeycomb cells disposed along a perimeter of the honeycomb core are filled with an adhesive or epoxy.

The present invention provides a cassette which has increased durability and reduced susceptibility to damage when dropped or roughly handled.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 2 shows a bottom view of the cassette of FIG. 1.

DETAILED DESCRIPTION OF THE INVENTION

Figure 1:
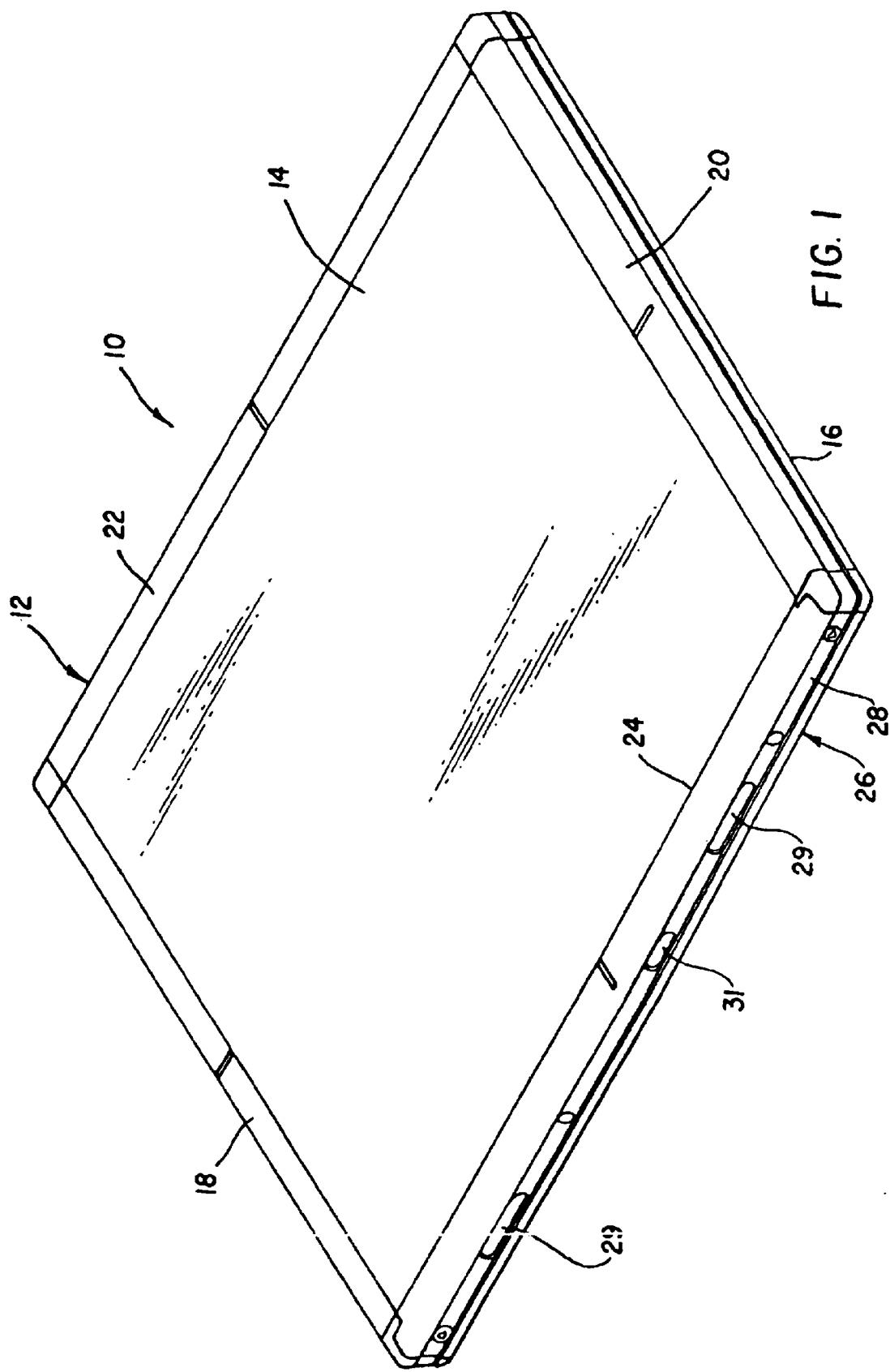
FIG. 1 shows a perspective view of a storage phosphor cassette in accordance with the present invention.

The following is a detailed description of the preferred embodiments of the invention, reference being made to the drawings in which the same reference numerals identify the same elements of structure in each of the several figures.

FIGS. 1–4 show a storage phosphor cassette 10 in accordance with the present invention. Cassette 10 includes a shell 12 comprising an upper panel 14, a lower panel 16, a first side member 18, a second side member 20, and a front end member 22. Upper and lower panels 14,16 are preferably rectangular in shape. First side member 18, second side member 20, and front end member 22 join upper and lower panels 14,16 to form a five-sided cavity having an open end 24.

Cassette 10 further includes a storage phosphor assembly 26 having a front edge 27, a back end member 28, an insert plate 30 having an upper face and being cantilevered from back end member 28, and a storage phosphor 32 disposed on the upper face of insert plate 30. A front edge of insert plate 30 includes corners 68,70, which are preferably rounded. Back end member 28 includes apertures 29,31 for access to the interior of back end member 28 to latch and unlatch a latch bar 50 slidably mounted therein.

Storage phosphor assembly 26 is removably contained within the cavity of shell 12 such that back end member 28 of storage phosphor assembly 26 closes off open end 24 of shell 12, thereby providing a light-tight enclosure for storage phosphor 32.

Figure 5:
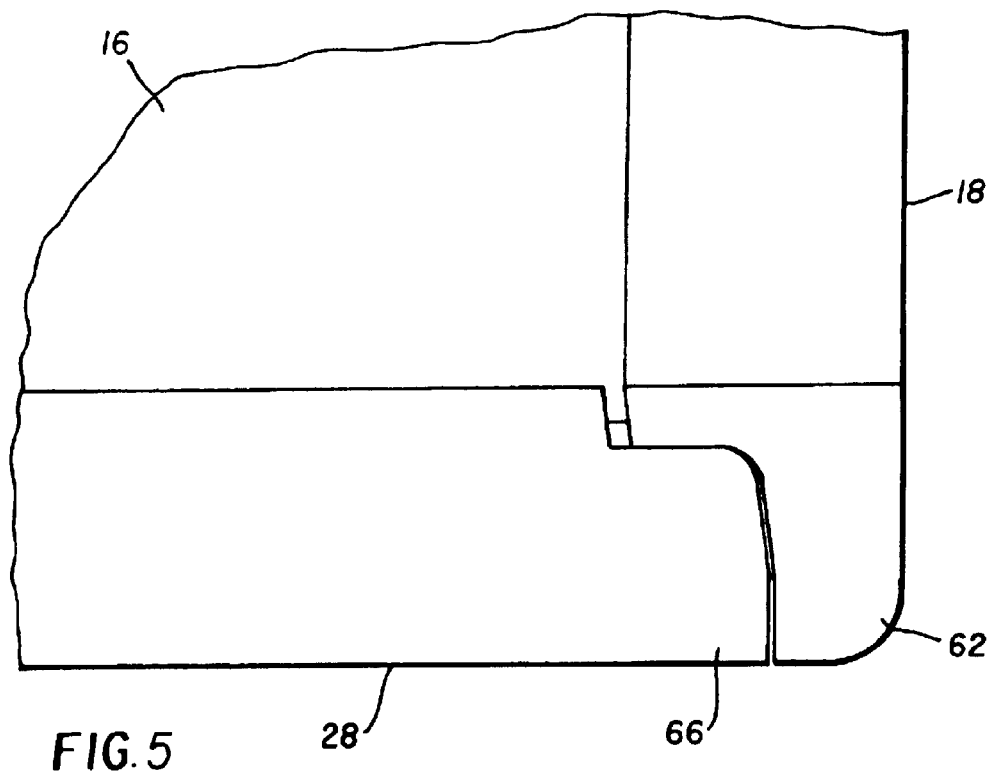
FIG. 5 shows a bottom view of a corner of the cassette of FIG. 2.
Figure 6:
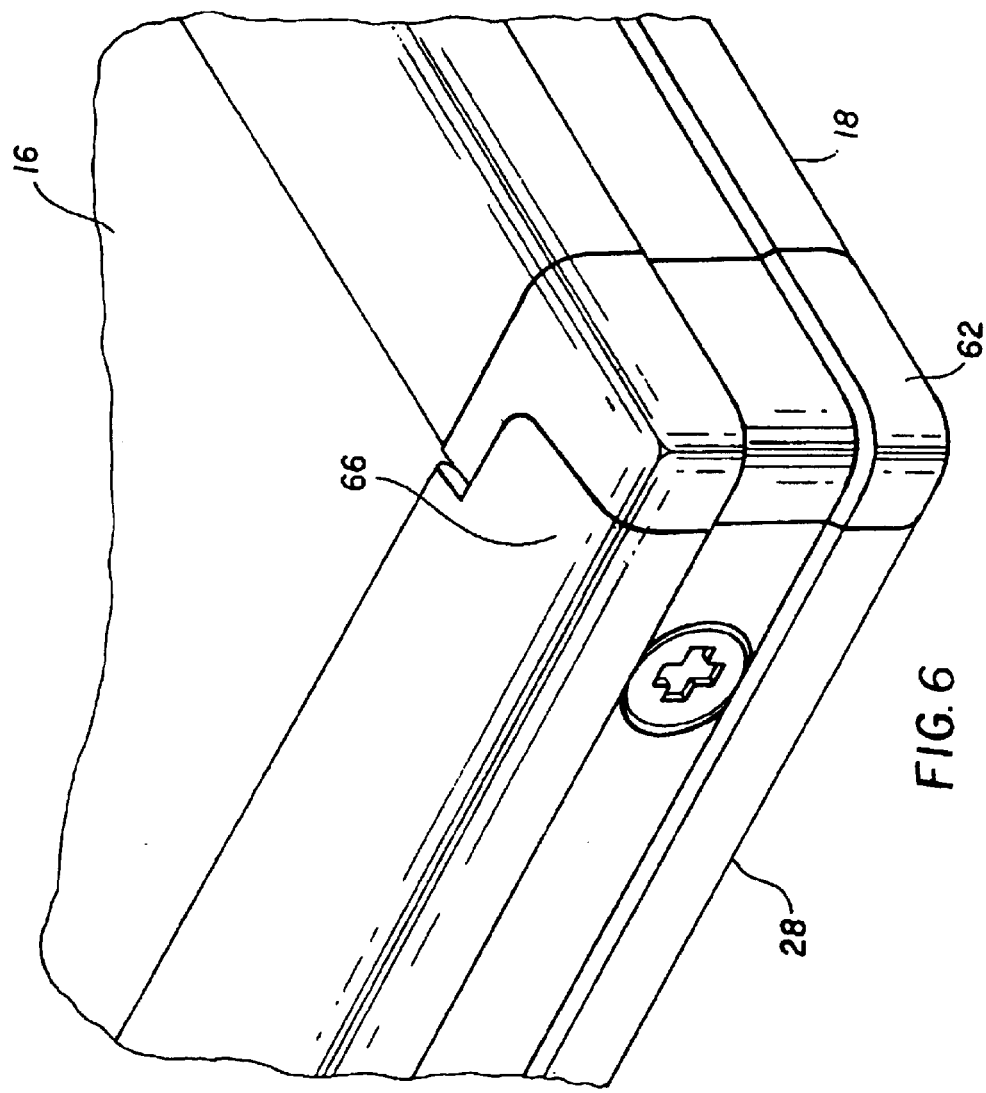
FIG. 6 shows a perspective view of a corner of the cassette of FIG. 2.

Back end member 28 of storage phosphor assembly 26 includes end portions 64,66. First and second side members 18,20 include a corner structure 60,62, respectively, which respectively engage end portions 64,66. Corner structures 60,62 can be integral with first and second side members 18,20, or as illustrated, can be separate corner pieces which are secured to first and second side members 18,20. End portions 64,66 and respective corner structures 60,62 have complimentary, interlocking configurations, such that, should cassette 10 be dropped and a force exerted on either corner structure 60,62, the force is transferred to storage phosphor assembly 26, forcing assembly 26 into shell 12. Corner structure 62 engaged with end portion 66 is further illustrated in FIGS. 5–6.

Figure 7:
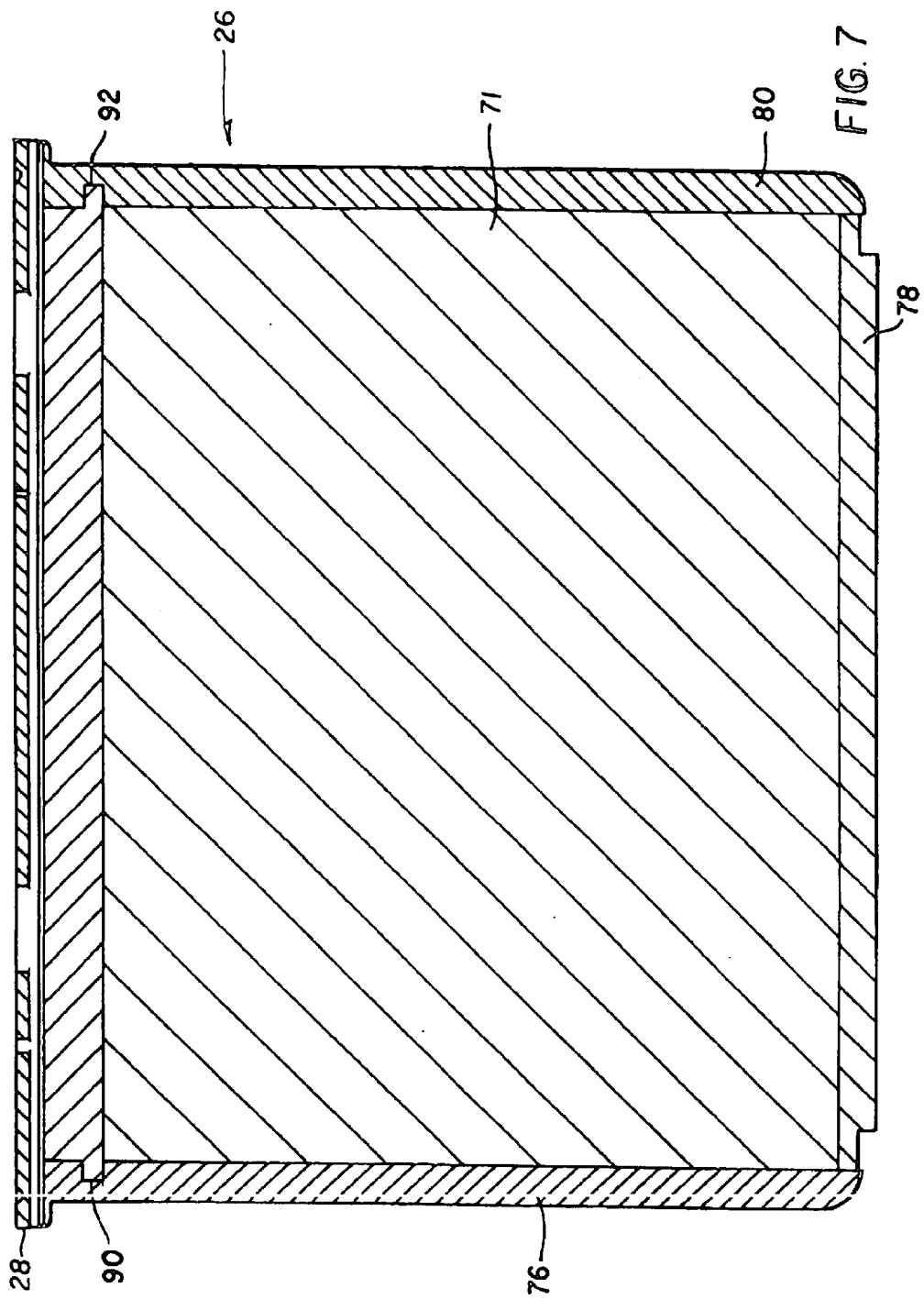
FIG. 7 shows a cross sectional view of the insert plate of the storage phosphor assembly of FIG. 3 taken along the plane of the insert plate.
Figure 8:
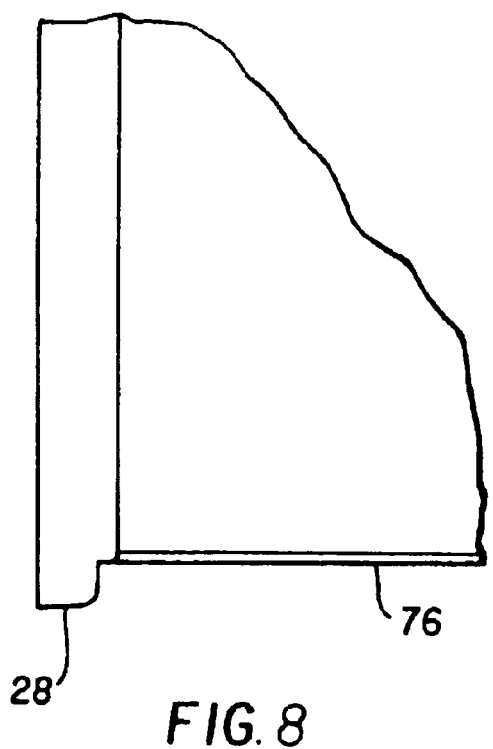
FIG. 8 shows a top view of a corner of the insert plate of the storage phosphor assembly of FIG. 3.
Figure 9:
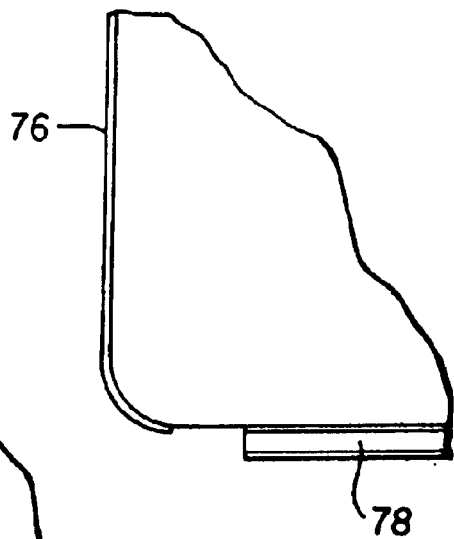
FIG. 9 shows a top view of another corner of the insert plate of the storage phosphor assembly of FIG. 3.
Figure 10:
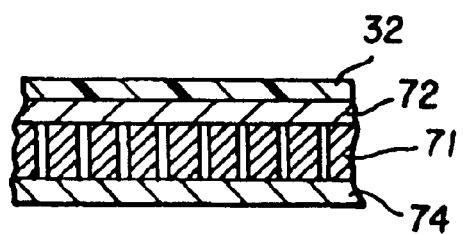
FIG. 10 shows a cross sectional view of insert plate of the storage phosphor assembly of FIG. 3 taken transverse to the plane of the insert plate.

Referring now to FIGS. 7–10, to minimize damage to insert plate 30 should cassette 10 be dropped, insert plate 30 is comprised of a lightweight rigid structure including an aluminum honeycomb core 71 and outer aluminum skins 72,74. The edge of honeycomb core 71 is milled out (recessed) around the entire perimeter to create a cavity. As best illustrated in FIG. 7, edge inserts 76,78,80 are each glued into a side of the cavity formed in the honeycomb structure. Back end member 28 is inserted to a fourth side of the cavity formed in the honeycomb structure. One end of edge insert 76 interlocks with back end member 28 by means of a connector 90 which can be, for example, a key or leg. Similarly, one end of edge insert 80 interlocks with back end member 28 by means of a connector 92 which can be, for example, key or leg. As illustrated in FIG. 7, connectors 90,92 are each shown as a leg of back end member 28 extending into edge inserts 76,80 in a direction parallel to the length of back end member 28, which is transverse to the length of edge inserts 76,80, respectively. The interlocking arrangement of edge inserts 76,80 with back end member 28 transfers a force from a side impact to cassette 10 to back end member 28 rather than buckling outer aluminum skins 72,74.

Figure 11:
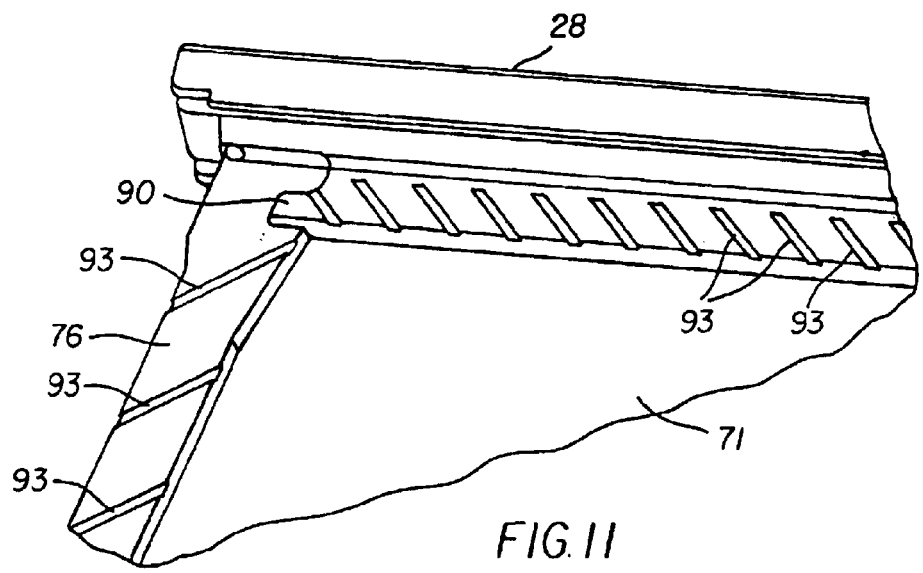
FIG. 11 shows a perspective view of a corner of the of insert plate of the storage phosphor assembly.
Figure 12:
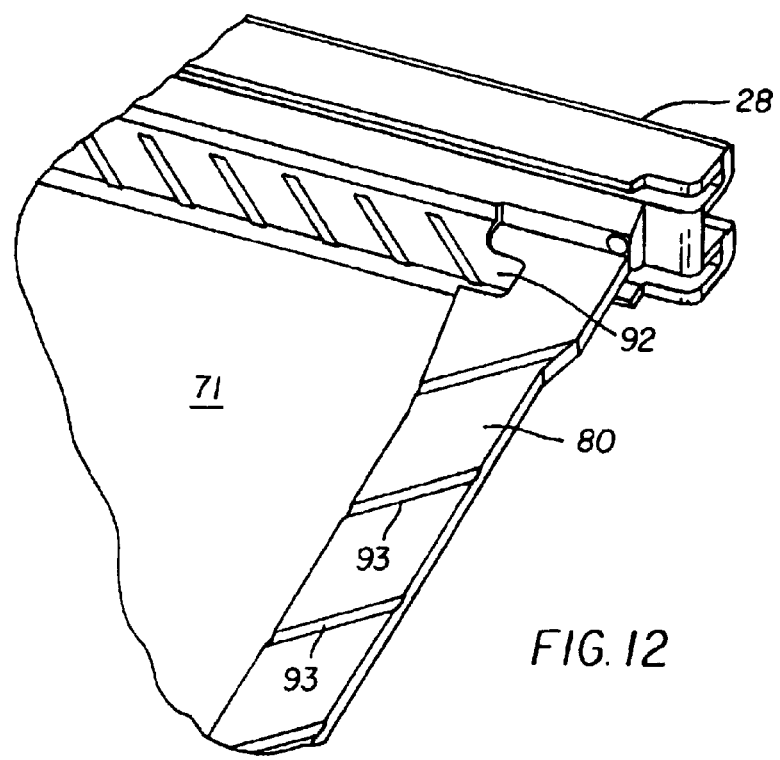
FIG. 12 shows a perspective view of another corner of the insert plate of the storage phosphor assembly.

Referring now to FIGS. 11–12, edge inserts 76,80 may optionally comprise a plurality of shallow slots or channels 93 disposed on at least one of its surfaces. Such channels 93 promote adhesion of the edge inserts with insert plate 30 since they provide additional surface area for the glue to migrate and adhere rather than being directed to the cells of the honeycomb. As illustrated, channels 93 form an angled relative to an edge of edge inserts 76, 80. A cross-hatch pattern might also be employed.

Figure 13:
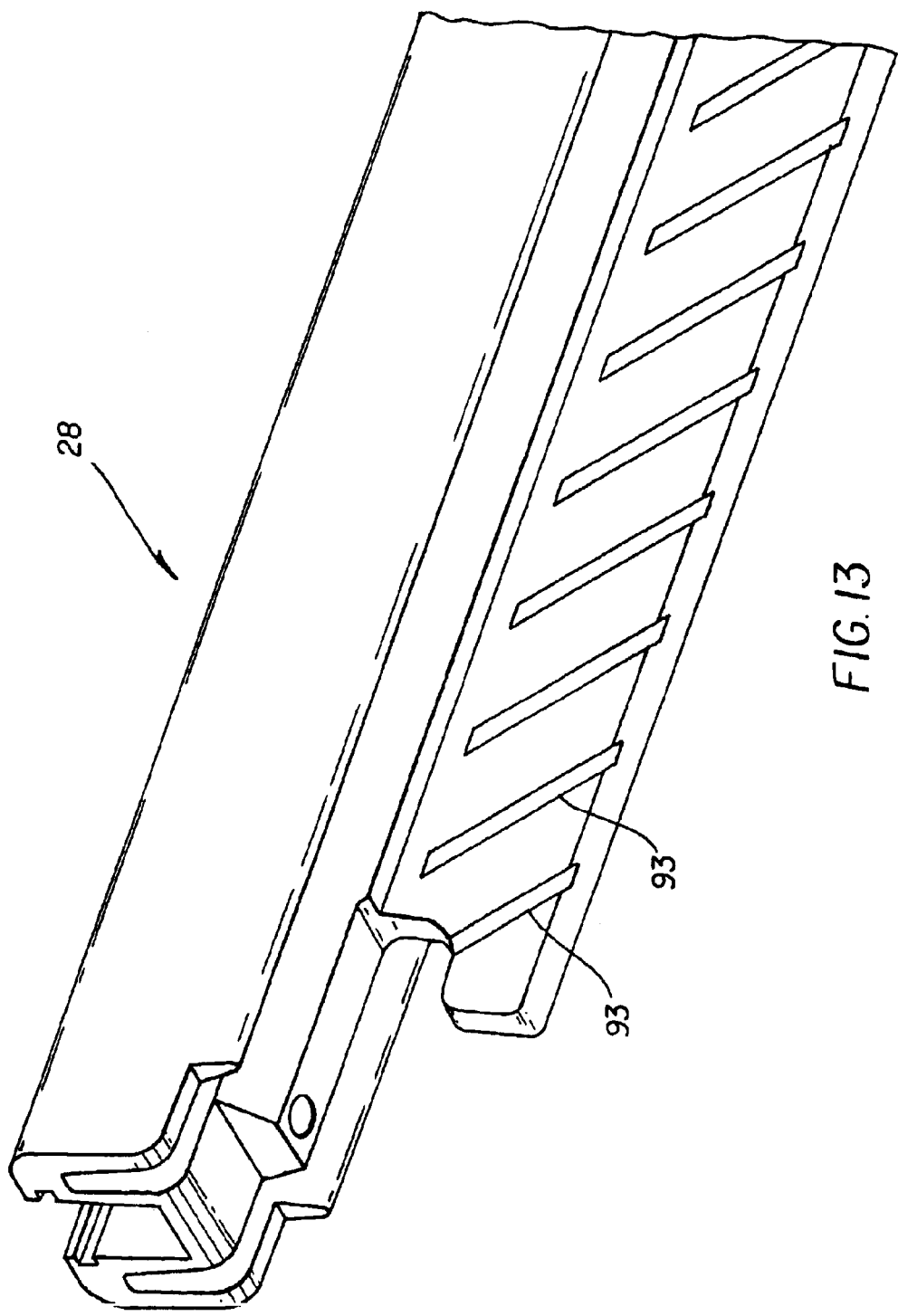
FIG. 13 shows a perspective view of the back end member of the storage phosphor assembly.

As illustrated in FIGS. 11–13, back end member 28 may also optionally comprise channels 93, with channels 93 being angled relative to an edge of back end member 28.

Figures 3, 4:
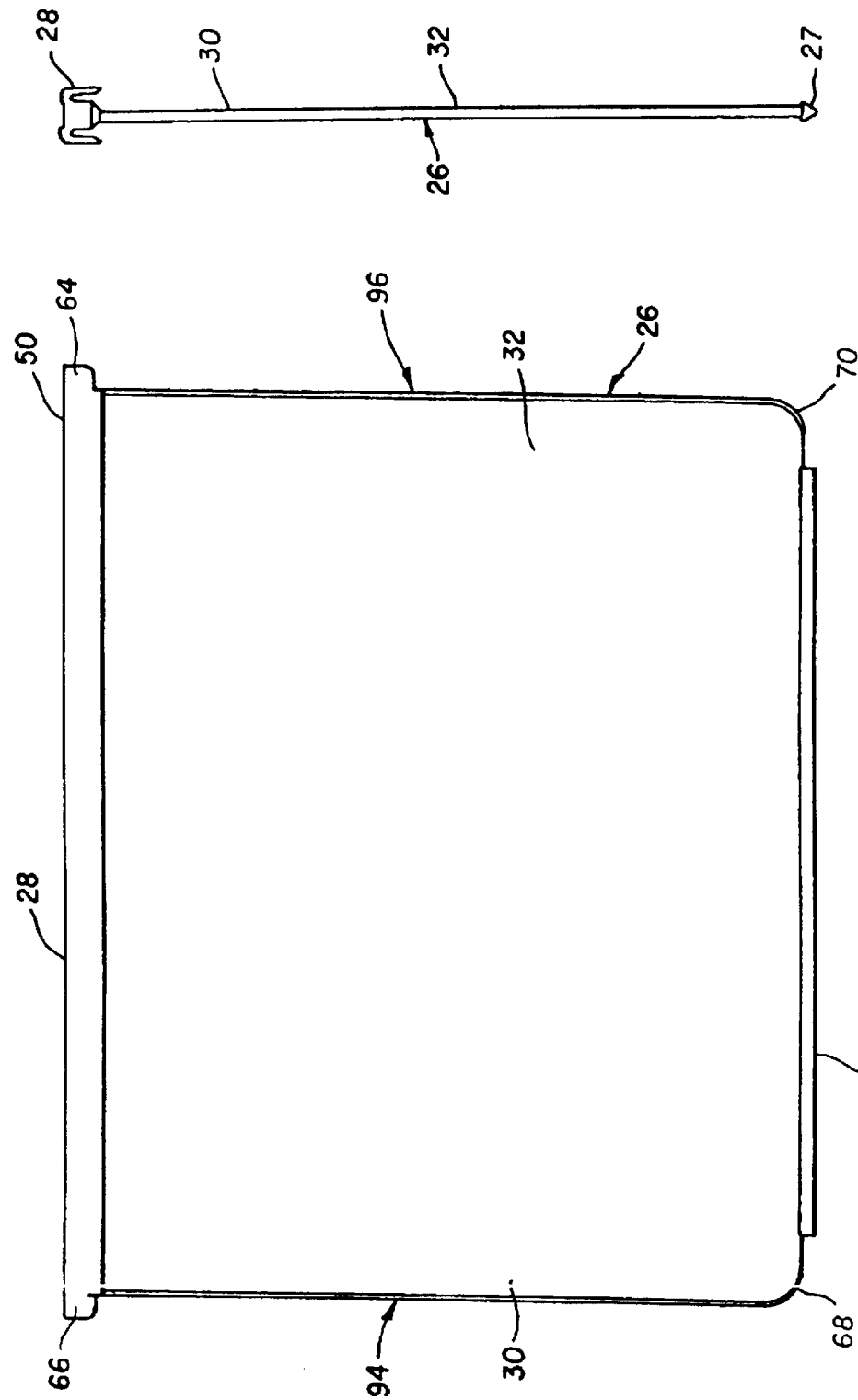
FIG. 3 shows a top view of the storage phosphor assembly of the cassette of FIG. 1.
FIG. 4 shows a side view of the storage phosphor assembly of FIG. 3.

Preferably, edge inserts 76,80 extend slightly beyond the perimeter of outer aluminum skins 72,74 (as shown in FIG. 3 at 94,96, respectively) thereby creating a shock absorption system to absorb and distribute forces on insert plate 30. If edge inserts 76,80 extend beyond the perimeter of outer aluminum skins 72,74, then preferably channels 93 are disposed on that portion of edge inserts 76,80 which do not extend beyond the perimeter, but rather, are disposed on that portion of edge inserts 76,80 internal to honeycomb core 71.

Preferably, edge inserts 76,80 are of aluminum, edge insert 78 is of a polymeric material, and back end member 28 is of an aluminum material.

Figure 14:
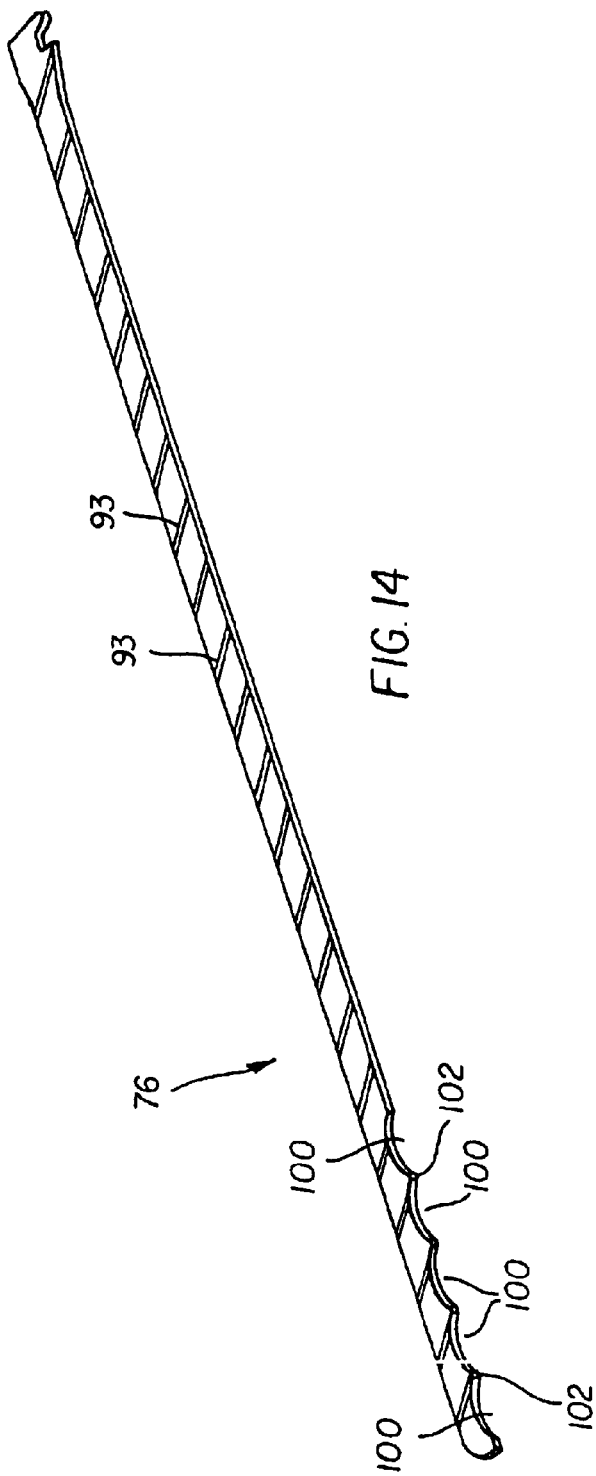
FIG. 14 shows an edge insert of the storage phosphor assembly in accordance with the present invention.
Figure 15:
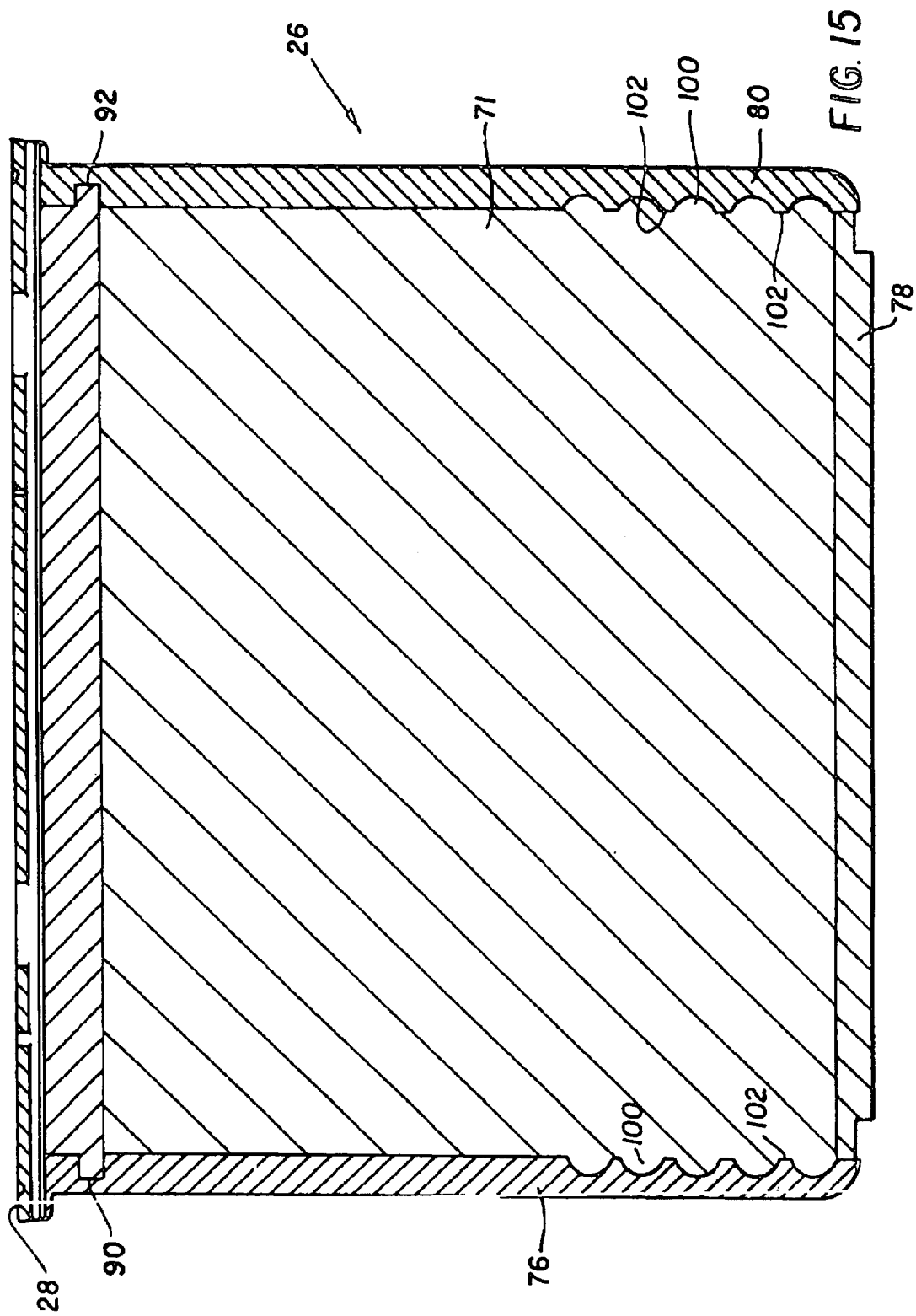
FIG. 15 shows a storage phosphor assembly incorporating the edge insert of FIG. 14.

Referring now to FIGS. 14 and 15, one side of edge inserts 76,80, (the side to be inserted into insert plate 30, i.e., the side glued into the side of the cavity formed in honeycomb core 71) may comprise a non-planar configuration. That is, a side of edge inserts 76,80 may include at least one groove or recess 100. Recess 100 is disposed at the end of edge inserts 76,80 adjacent edge insert 78. Accordingly, when edge insert 76 or 80 is inserted into insert plate 30, recess 100 promotes adhesion of the edge inserts with insert plate 30 since recess 100 provides additional surface area for the glue to migrate and adhere.

Further, any exposed (i.e, partially or fully open) cells of honeycomb core 71 disposed along the perimeter of honeycomb core 71 are preferably filled with an adhesive or epoxy material which also fills recesses 100 of edge inserts 76,80. The addition of the hardened adhesive or epoxy provides increased stiffness to the edge of honeycomb core 71. A filler material other than adhesives and epoxys might be employed to fill the cavities of the cells to provide compressive support structure, for example, liquid materials which harden when cured, adhesives, sealants, surface fillers, potting or encapsulating compounds, and expanding foams. Examples of adhesives include epoxy adhesives, methacrylate adhesives, urethane adhesives, and hot melt adhesives. Examples of sealants include silicone sealant, urethane sealant, polysulfide sealant, and acrylic caulk. Examples of surface fillers and potting compounds include polyester resin with talc powder, epoxy resin with silica, polymeric putties and resin systems. Examples of expanding foams include two-part liquid expanding urethane foam. If any of these materials include adhesive characteristics, the materials will promote adhesion between the edge inserts with the insert plate in addition to providing structural support.

The stiffness of the edge of honeycomb core 71 is further enhanced since the linear path for bending/buckling has been reduced/eliminated. That is, there is no longer a linear path for bending or buckling to occur between edge inserts 76,80 and honeycomb core 71, in the event of an impact force or rough handling to cassette 10. Should cassette 10 experience an impact force, the impact force would be directed along the non-linear path where the adhesive (filler material) interfaces to either honeycomb core 71 or recesses 100 in edge inserts 76,80, and since there is no linear path, the likelihood of bending or bucking is reduced/eliminated. Stated alternatively, should cassette 10 experience an impact force, the additional material filling honeycomb core 71 in conjunction with the non-linear interfaces of the adhesive/epoxy to both honeycomb core 71 and recesses 100 in edge inserts 76,80, reduce/eliminate the likelihood of bending or buckling in that location since the linear interface has been removed, the linear interface being the area likely to fail (i.e., prone to failure).

A plurality of recesses 100 may be employed in each edge insert 76,80 as illustrated in FIGS. 14 and 15 wherein five recess 100 are employed with an interstice 102 therebetween.

Figure 16:
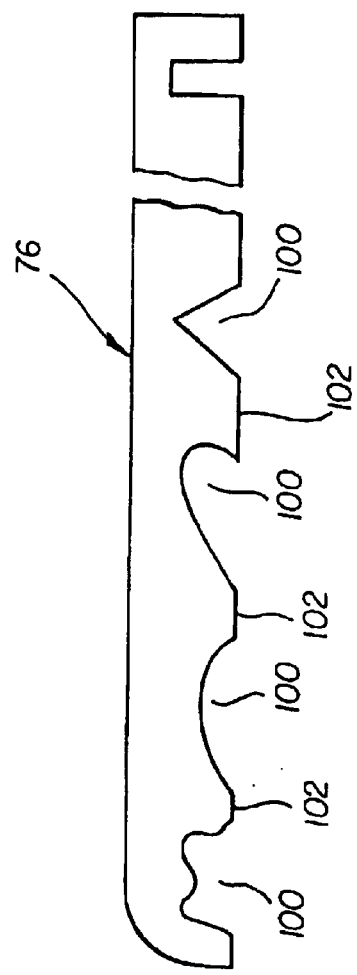
FIG. 16 shows an edge insert illustrating various recess configurations.

Applicants have noted that five or six recesses 100 may be suitable for the present application with each recess 100 comprising a semi-circular shape having a radius of 0.5 inches and interstice 102 of 0.080 inches. However, those skilled in the art will recognize that other shapes for recess 100 may be suitable. For example, as illustrated in FIG. 16, recess 100 may comprise a wave, oval, skewed curve, or a linear shape such as a triangle. Fewer or more recesses 100 may be employed than that illustrated in FIGS. 14 and 15. Similarly, interstice 102 may be greater or smaller than that illustrated.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST | |
|---|---|
| 10 | cassette |
| 12 | shell |
| 14 | upper panel |
| 16 | lower panel |
| 18 | first side member |
| 20 | second side member |
| 22 | front end member |
| 24 | open end |
| 26 | storage phosphor assembly |
| 27 | front edge |
| 28 | back end member |
| 29, 31 | apertures |
| 30 | insert plate |
| 32 | storage phosphor |
| 50 | latch bar |
| 60, 62 | corner structures |
| 64, 66 | end portions |
| 68, 70 | front corners |
| 71 | honeycomb core |
| 72, 74 | outer aluminum skins |
| 76, 78, 80 | edge inserts |
| 90 | connector |

-continued

| PARTS LIST | |
|---|---|
| 92 | connector |
| 93 | channels; slots |
| 94, 96 | extensions |
| 100 | groove; recess |
| 102 | interstice |

What is claimed is:

1. An x-ray cassette, comprising:
a shell comprising an upper and lower panel, a first and second side member, and a front end member, the first and second side members and front end member joining the upper and lower panels to define a cavity having an open end; and
a storage phosphor assembly comprising a back end member, an insert plate, and an edge insert, the storage phosphor assembly adapted to be removably contained within the shell such that the back end member closes off the open end of the shell, a first side of the edge insert being affixed to the insert plate, a first end of the edge insert disposed adjacent the back end member, a second end of the edge insert comprising at least one recess on the first side wherein the recess is formed by removing material from the first side thereby forming a non-linear interface between the edge insert and the insert plate.

2. The x-ray cassette of claim 1, wherein the second end of the edge insert comprises a plurality of recesses on the first side having an interstice therebetween.

3. The x-ray cassette of claim 2, wherein each recess has a curved shape.

4. The x-ray cassette of claim 3, wherein each recess comprises a semi-circular shape.

5. The x-ray cassette of claim 4, wherein each recess has a radius of about 0.5 inches spaced by about 0.080 inches.

6. The x-ray cassette of claim 1, wherein the insert plate further comprises a second edge insert, a second side of the second edge insert being affixed to the insert plate, a first end of the second edge insert disposed adjacent the back end member, a second end of the second edge insert comprising at least one recess on the second side.

7. The x-ray cassette of claim 1, wherein the insert plate includes a honeycomb core comprising honeycomb cells, the honeycomb cells disposed along a perimeter of the honeycomb core being filled with a filler material.

8. The x-ray cassette of claim 1, wherein the insert plate includes outer aluminum skins sandwiching a honeycomb core.

9. The x-ray cassette of claim 8, wherein the edge inserts extend beyond the perimeter of the aluminum skins, thereby creating a shock absorption system to absorb and distribute forces exerted on the insert plate.

10. The x-ray cassette of claim 8, wherein edges of the core are recessed from the edges of the outer aluminum skins to create a cavity along a first and second side of the insert plate.

11. The x-ray cassette of claim 1, wherein the edge insert comprises at least one shallow channel disposed thereon.

12. The x-ray cassette of claim 11, wherein the channel is disposed at an angle relative to an edge of the edge insert.

13. The x-ray cassette of claim 1, wherein the back end member comprises at least one shallow channel disposed thereon.

14. The x-ray cassette of claim 13, wherein the channel is disposed at an angle relative to an edge of the back end member.

15. An x-ray cassette, comprising:

a shell comprising an upper and lower panel, a first and second side member, and a front end member, the first and second side members and front end member joining the upper and lower panels to define a cavity having an open end; and a storage phosphor assembly comprising a back end member, an insert plate, and first and second edge inserts, the storage phosphor assembly adapted to be removably contained within the shell such that the back end member closes off the open end of the shell, the first and second edge inserts each being affixed to the insert plate, the first and second edge inserts each having a first end disposed adjacent the back end member, the first and second edge inserts each having a second end comprising a plurality of spaced recesses wherein the recesses are formed by removing material from the edge inserts thereby forming a non-linear interface between each edge insert and the insert plate.

16. The x-ray cassette of claim 15, wherein each recess comprises a semi-circular shape having a radius of about 0.5 inches spaced by about 0.080 inches.

17. The x-ray cassette of claim 15, wherein the insert plate includes outer aluminum skins sandwiching a core.

18. The x-ray cassette of claim 17, wherein the first and second edge inserts extend beyond the perimeter of the aluminum skins, thereby creating a shock absorption system to absorb and distribute forces exerted on the insert plate.

19. The x-ray cassette of claim 17, wherein edges of the core are recessed from the edges of the outer aluminum skins to create a cavity along a first and second side of the insert plate.

20. The x-ray cassette of claim 15, wherein the first and second edge inserts each comprise a plurality of channels disposed thereon, and the channels are disposed at an angle relative to an edge of the first and second edge inserts.

21. The x-ray cassette of claim 15, wherein the back end member comprises a plurality of channels, and the channels are disposed at an angle relative to an edge of the back end member.

22. The x-ray cassette of claim 15, wherein the insert plate includes a honeycomb core comprising honeycomb cells, the honeycomb cells disposed along a perimeter of the honeycomb core being filled with an adhesive or epoxy.

* * * * *